UNITED STATES PATENT OFFICE.

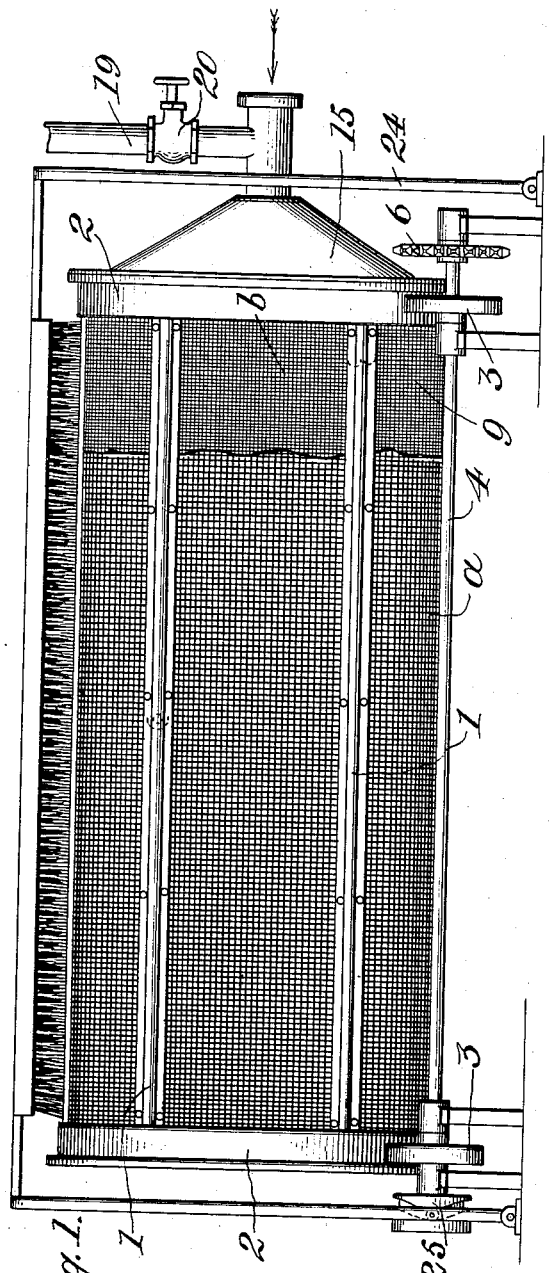

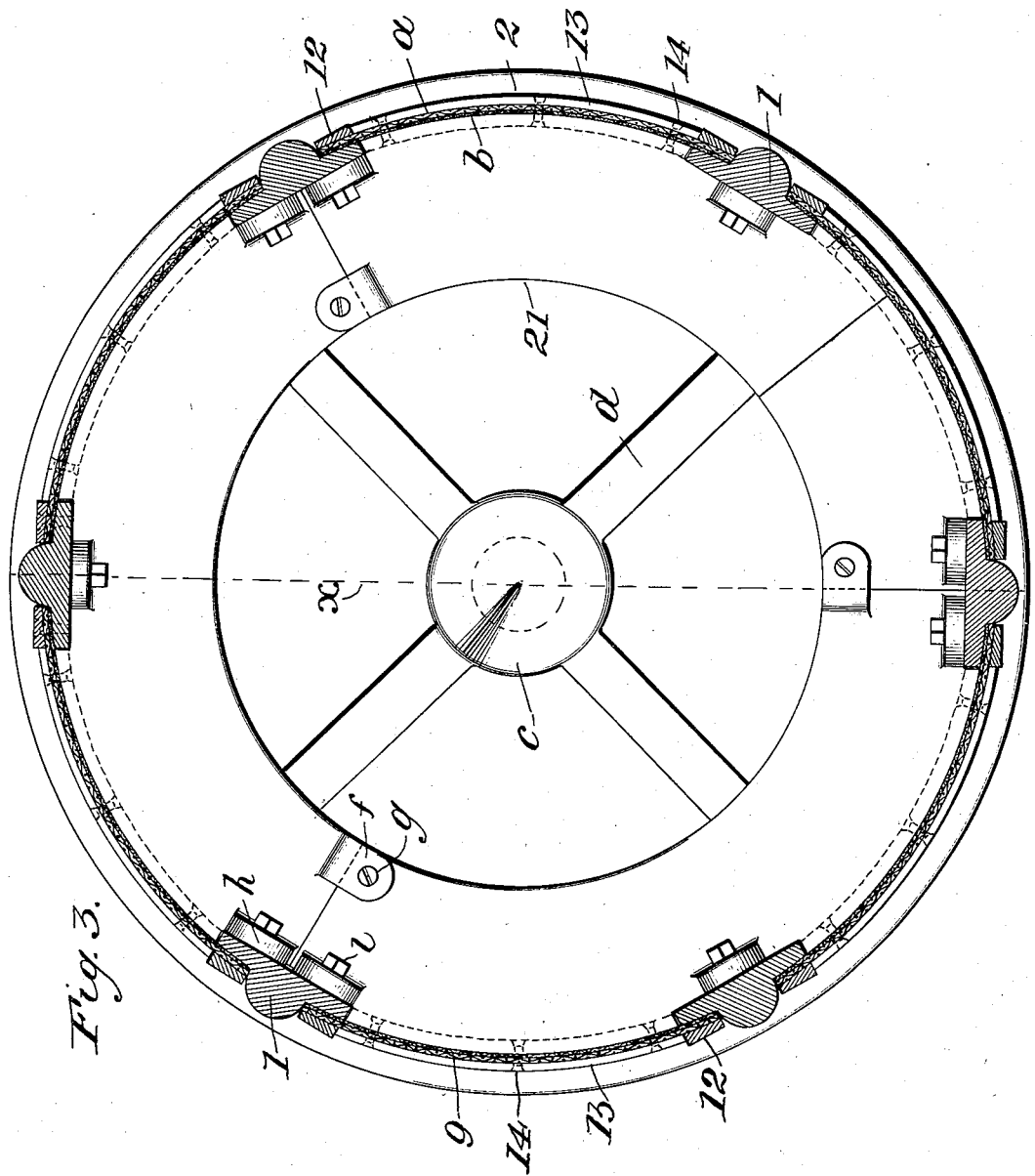

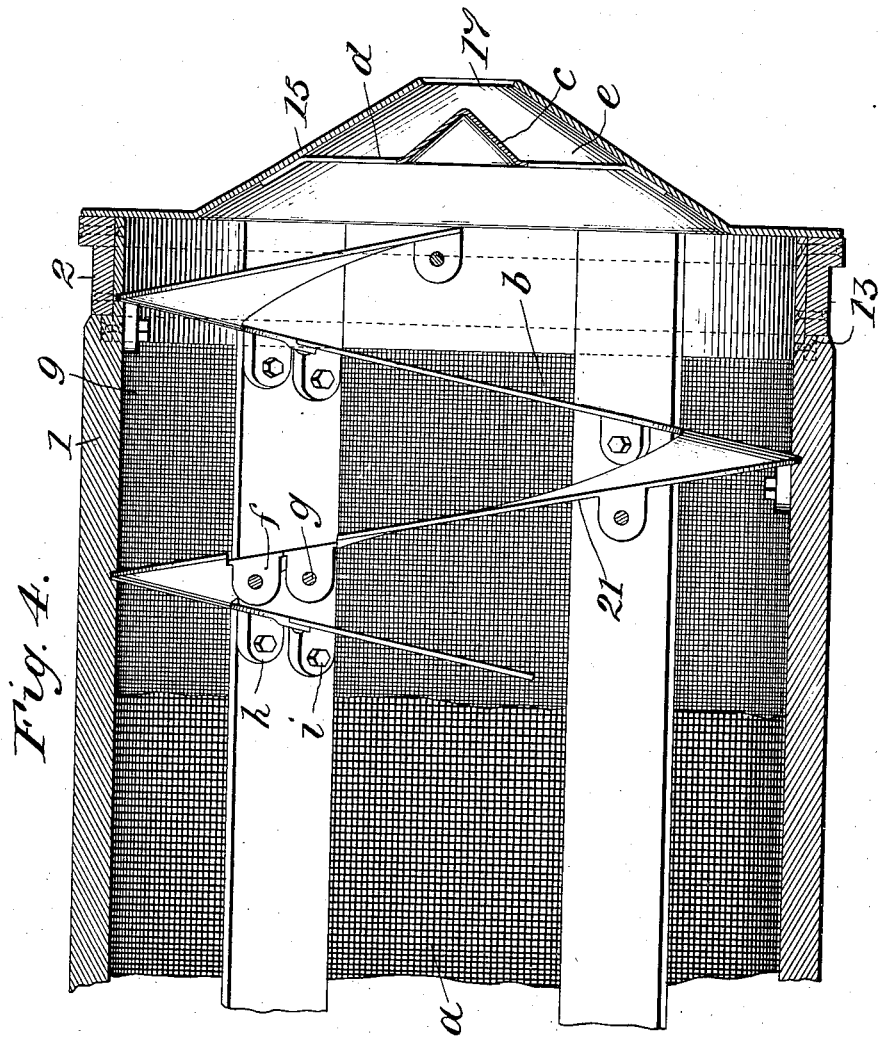

JOHN B. ADT, OF BALTIMORE, MARYLAND, ASSIGNOR TO THE JOHN B. ADT COMPANY, A CORPORATION OF MARYLAND.

ROTARY FILTERING APPARATUS.

1,098,076.  Specification of Letters Patent.  Patented May 26, 1914.

Application filed September 29, 1913. Serial No. 792,536.

*To all whom it may concern:*

Be it known that I, JOHN B. ADT, a citizen of the United States, and resident of Baltimore, Maryland, have invented certain Improvements in Rotary Filtering Apparatus, of which the following is a specification.

This invention relates to improved means for separating from materials such for instance, as grain which has been used in brewing and distilling operations, a large proportion of the contained water, thereby facilitating a drying operation to which the material is subsequently subjected; and the apparatus as hereinafter described and claimed, is particularly applicable for use in connection with a drying apparatus for which Letters Patent No. 1,057,912 were granted to me on the 1st day of April, in the year 1913, to which reference should be made.

In the further description of the said invention which follows, reference is made to the accompanying drawings, forming a part hereof, and in which:—

Figure 1 is a partly sectional side view of the improved rotary filtering apparatus; and Fig. 2 an end view of the same looking in the direction indicated by the arrow in that figure. Fig. 3 is an enlarged cross section of Fig. 1 with certain parts thereof removed; and Fig. 4 a section on a reduced scale of Fig. 3 taken on the broken line $x$.

Referring now to the drawings, 1, 1 are horizontally extending bars which are united at their ends by means of flanged rings 2 to form a skeleton cylinder or drum. The rings 2 rest on supporting rollers 3 on the shafts 4 and 5; and the shaft 4 is provided with a sprocket wheel 6 adapted to be driven through the medium of the sprocket chain 7, to effect the rotation of the drum.

9, 9 are segments of the filtering element of the apparatus formed preferably of woven wire in two layers or thicknesses, viz: an outer layer $a$ of coarse, and an inner layer $b$ of a finer mesh, the lateral edges of which overlap the bars 1, and are held thereto by other bars 12 which extend lengthwise of the skeleton drum, and the segmental bars 13.

Rivets 14 serve to fasten the parts described together, and thereby form a complete filtering device adapted for the passage of water therethrough, and the interception of solid matter contained in the water.

The end of the drum to the left of Fig. 1 is entirely open, and the end to the right of the said figure, is provided with a flanged conical and outwardly projecting head 15 having a central feed opening 17 as shown in Fig. 4. In order to direct the watery material fed to the opening 17, directly to the circumference of the drum, the conical head 15 is provided with an inner conical deflector $c$ of a less diameter than the head, to produce the annular channel $e$. The cone $c$ is supported by the head 15 by means of the arms $d$, see Figs. 3 and 4. By the construction described the materials fed to the drum are not projected to any considerable distance longitudinally of the drum but instead are guided to near its end, thus practically increasing the effective length of the filtering surface. The watery material is carried from a source of supply, to the opening 17 in the head 15, by the pipe 19; and the quantity of the matter introduced into the cylinder, is regulated by the valve 20 in the said pipe.

From the foregoing description it will be understood that the water contained in the material fed to the drum, will escape therefrom through the woven wire segments; and that the inner or finer mesh segments $b$ constitute the straining or filtering means, the coarser mesh segments $a$ serving principally as supports for the segments $b$ to prevent their sagging by the weight of the solid constituent of the material left in the drum.

In order to produce a movement of the solid matter deposited in the drum longitudinally of the same, and its final discharge, the drum is provided with an internal conveying screw 21 which for sake of convenience in construction, and to admit of its being easily introduced into the drum, is formed in segmental sections connected by lugs $f$ and screws $g$, and fastened to the bars 1 by other lugs $h$ and bolts $i$. Another function of the internal conveyer screw is to prevent a too rapid discharge of the semi-liquid mass, or to retain the mass within the cylinder for a considerable period of time and thereby insure as much straining off of the water as is possible.

As all filtering or screening devices adapted to separate water from its contained solid matter, when in constant use, are liable to become clogged, I suspend a brush 22 over and with its bristles in contact with screening surface of the drum, by means of the pivoted frame 24; and use in connection with the frame, a cam 25 which is on, and rotated by the driving shaft 4. By this means the brush is given a reciprocating motion longitudinally of the drum which, in conjunction with the rotation of the drum, serves to scour the outer surface of the screening element of the apparatus, and prevent the interstices therein becoming clogged with the solid constituent of the material introduced into the drum.

I claim as my invention:—

1. In an apparatus for the purpose described, a rotary drum having a cylindrical screening wall and a screw conveyer therein having a movement in common with the drum, the said drum at its entrance end being provided with a centrally open conical head, combined with an inner conical deflector of a less diameter than the head, whereby the material fed into the annular space between the two conical surfaces, is directed to the filtering surface near to its entrance end.

2. In an apparatus for the purpose described, a rotary drum having a screening cylindrical wall and a screw conveyer therein having a movement in common with the drum, the said drum at its entrance end being provided with a centrally open conical head, combined with an inner conical deflector of a less diameter than the head and supported by arms from the same, whereby an annular conical feed channel is produced for the purpose set forth.

3. In an apparatus for the purpose described, a rotary drum having a cylindrical screening wall and a screw conveyer therein having a movement in common with the drum, combined with an outwardly extending conical head with a central feed opening therein, and an inner conical deflector of a less diameter than the head and carried thereby, whereby an inclined annular channel is produced leading to the inner circumference of the drum and near to its feed end.

JOHN B. ADT.

Witnesses:
 Jos. H. Thomas,
 Wm. T. Howard.